Patented June 10, 1941

2,245,361

UNITED STATES PATENT OFFICE 2,245,361

PREPARATION OF 2-MERCAPTO THIAZOLINES

Paul Swithin Pinkney, Wilmington, Del., assignor to E. I. du Pont de Nemours & Company, Wilmington, Del., a corporation of Delaware No Drawing. Application February 21, 1940, Serial No. 320,009

12 Claims. (Cl. 260—302)

This invention relates to the preparation of 2-mercapto thiazolines and particularly from N-(2-hydroxyalkyl) amides of carboxylic acids.

2-mercapto thiazolines are well known compounds. It has been found that such 2-mercapto thiazolines are excellent accelerators for the vulcanization of rubber. It was early proposed to prepare these compounds from alkanolamines and carbon disulfide. Such early methods gave very low yields, and hence the compounds have not been commercially available until very recently.

It is an object of the present invention to provide a new and economical process for preparing 2-mercapto thiazolines. Another object is to provide a method for preparing 2-mercapto thiazolines from relatively cheap starting materials. A further object is to provide a one-step process for preparing 2-mercapto thiazolines from N-(2-hydroxyalkyl) amides of carboxylic acids. Other objects are to advance the art. Still other objects will appear hereinafter.

The above and other objects may be accomplished in accordance with my invention, which comprises heating an N-(2-hydroxyalkyl) amide of a carboxylic acid with carbon disulfide at temperatures above 50° C. in the presence of water or caustic alkali or both, employing at least 2 moles of carbon disulfide for each mole of the 2-mercapto thiazoline to be produced. I have found that, by such process, the 2-mercapto thiazolines are produced directly in a single step and in good yields.

The 2-hydroxyalkyl amides, which may be advantageously employed as starting materials in my process, may be prepared by the action of carbon monoxide and ammonia on 1,2-glycols, such as ethylene glycol, at high temperatures and pressures in the presence of a catalyst.

The amount of carbon disulfide employed may be varied over wide limits, but preferably is from 2 to 3 moles for each N-(2-hydroxyalkyl) amide group present. Thus, if the amide of a monocarboxylic acid is employed, from 2 to 3 moles of carbon disulfide will be employed. If the diamide of a dicarboxylic acid is employed, from 4 to 6 moles of carbon disulfide will be employed for each mole of the diamide. Smaller proportions of carbon disulfide may be employed, but usually with decreased yields of 2-mercapto thiazolines. One mole of hydrogen sulfide and one mole of carbon oxysulfide appears to be formed for each mole of 2-mercapto thiazoline produced. Accordingly, it is essential to employ at least 2 moles of carbon disulfide for each mole of the 2-mercapto thiazoline to be produced.

The amount of water or caustic alkali or both may be widely varied. However, for best results, at least 1 mole of water or caustic alkali or both should be used for each mole of 2-mercapto thiazoline to be produced. The best results are obtained in the presence of both water and caustic alkali, and particularly when 1 molecule of caustic alkali is present for each carboxylic acid group. In other words, when an amide of a monocarboxylic acid is employed, the best results are obtained if at least 1 mole of caustic alkali is present for each mole of the amide. When the amide of a dicarboxylic acid is employed, the best results are obtained with 2 moles of caustic alkali for each mole of amide. Water may be employed alone. However, it is preferred to employ an alkaline catalyst with the water. Caustic alkali in small amounts appears to function as a catalyst. Alkali metal formates also are desirable catalysts to be employed with water.

Solvents, other than water, may be employed if desired. However, the best results appear to be obtained in the absence of such added solvents.

The temperatures employed for carrying out the reaction may be widely varied. The temperatures should be above 50° C. and generally not higher than about 200° C. When N-(2-hydroxyethyl) amides are employed, the temperatures should preferably be between about 90° C. and about 130° C. When N-(2-hydroxyalkyl) amides, containing 3 or more carbon atoms in the alkyl group, are employed, the temperatures should be between about 120° C. and about 200° C. The time required for completion of the reaction will generally vary inversely with the temperature, the reaction taking place within shorter periods of time at the higher temperatures. Usually from 6 to 10 hours will be sufficient.

It is generally advisable to carry out the reaction in a closed vessel, particularly when the higher temperatures are employed. The use of such a closed vessel will result in the reaction being carried out at superatmospheric pressures produced by the gaseous reaction products and the vapors of the solvents and reacting ingredients employed. When N-(2-hydroxyethyl) amides are employed, the reaction may be carried out at atmospheric pressures under reflux at the lower temperatures, although the use of a closed vessel and the higher temperatures is generally preferred. When the higher homologues of the N-(2-hydroxyethyl) amides are employed, a closed vessel is required because of the higher temperatures employed.

When the reaction is completed, the reaction mixture is preferably dissolved in caustic alkali and the solution filtered to remove impurities. The filtrate is then acidified to precipitate the 2-mercapto thiazoline which may be washed with water and dried. The 2-mercapto thiazoline may be further purified by crystallization from an appropriate solvent, such as alcohol or toluene or the like. Other methods of separating the 2-mercapto thiazoline from the reaction mixture may be employed.

In order to illustrate my invention more clearly, the preferred modes of carrying the same into effect and the advantageous results obtained, the following examples are given in which the parts are by weight:

Example I

A mixture of 54 parts of 2-hydroxyethylformamide, 109 parts of carbon disulfide, 27 parts of sodium hydroxide, and 200 parts of water was heated under reflux for 20 hours with stirring. Hydrogen sulfide was evolved during the reaction. The cooled reaction mixture was filtered to separate the crystalline 2-mercapto thiazoline which, after purification by solution in 10% sodium hydroxide solution, treatment with decolorizing charcoal, and reprecipitation with dilute hydrochloric acid, weighed 4.5 parts (9% yield). The reaction mixture contained unreacted carbon disulfide.

Example II

A mixture of 27 parts of 2-hydroxyethylformamide, 46 parts of carbon disulfide and 50 parts of water was placed in a steel bomb and heated at 120° C. for a period of 10 hours. The reaction mixture was filtered and the insoluble solid product was purified by solution in 10% sodium hydroxide solution, treatment with decolorizing charcoal, and reprecipitation with dilute hydrochloric acid. The yield of 2-mercapto thiazoline thus obtained was 3.2 parts (9% of the theoretical).

Example III

The reaction was carried out as in Example II using 27 parts of 2-hydroxyethylformamide, 46 parts of carbon disulfide, 20.4 parts of sodium formate, and 50 parts of water. The yield of 2-mercapto thiazoline was 8.7 parts (24% of the theoretical).

Example IV

The reaction was carried out as in Example II using 31 parts of 2-hydroxyethylacetamide, 46 parts of carbon disulfide, 16 parts of sodium hydroxide, and 50 parts of water. The yield of 2-mercapto thiazoline was 16.5 parts (46% of the theoretical).

Example V

The reaction was carried out as in Example II using 23 parts of 2-hydroxyethylbenzamide, 21 parts of carbon disulfide, 6.6 parts of sodium hydroxide, and 75 parts of water. The yield of 2-mercapto thiazoline was 0.8 parts (5% of the theoretical).

Example VI

A mixture of 27 parts of 2-hydroxyethylformamide, 45.5 parts of carbon disulfide, 13.5 parts of sodium hydroxide, and 50 parts of water was placed in a steel bomb (200 cc. capacity) and heated at 120° C. for a period of six hours. The reaction mixture was filtered and the solid product was taken up in 100 parts of warm 10 per cent sodium hydroxide. The clear filtrate, obtained by filtering the cloudy solution through kieselguhr, was acidified with dilute hydrochloric acid. The resulting precipitate of 2-mercapto thiazoline was collected on a filter, washed with water and dried. The yield of 2-mercapto thiazoline, M. P. 105–106° C., was 19 parts (53% of the theoretical).

Example VII

A solution of 18 parts (1 mole) of 2-hydroxyethylformamide and 38 parts (2.5 moles) of carbon disulfide in 75 parts of 95% ethanol was placed in a steel bomb and heated at 170° C. for a period of 6 hours. After evaporation of volatile material from the reaction mixture, the residue was taken up in 75 parts of 10% sodium hydroxide solution and warmed with decolorizing charcoal. The mixture was filtered hot and the cooled filtrate was acidified with dilute hydrochloric acid and cooled further to ensure complete precipitation of the product. The precipitate was washed on the filter with cold water and air dried. The yield of 2-mercapto thiazoline was 7.6 parts (32% of the theoretical).

Example VIII

A mixture of 18 parts of 2-hydroxyethylformamide, 38 parts of carbon disulfide, and 9 parts of sodium hydroxide was placed in a steel bomb and heated at 120° C. for 10 hours. The reaction mixture was taken up in 75 parts of water, treated with decolorizing charcoal, and filtered hot. The filtrate was acidified with dilute hydrochloric acid with cooling, and the resulting precipitate of 2-mercapto thiazoline was filtered out and washed on the filter with cold water. The yield was 11.6 parts (48% of the theoretical).

It will be understood that the above examples are given for illustrative purposes only. Many variations and modifications may be made therein and in the conditions employed. Many other N-(2-hydroxyalkyl) amides of other carboxylic acids may be substituted for those given in the examples. Preferably, the amides are the amides of monocarboxylic acids, particularly of unsubstituted carboxylic acids, that is, those acids which, except for the carboxylic groups, consist of carbon and hydrogen. I particularly prefer the amides of the aliphatic acids and especially of the unsubstituted monocarboxylic aliphatic acids. Among the N-(2-hydroxyalkyl) amides, which will be suitable starting materials for practicing my invention, are the N-(2-hydroxyalkyl) amides derived from the following hydroxyalkyl amines and carboxylic acids:

| Hydroxyalkyl amines | Acids |
| --- | --- |
| 1-amino-2-ethanol | Formic. |
| 2-amino-1-propanol | Acetic. |
| 2-amino-1-butanol | Glycolic. |
| 1-amino-2-butanol | Propionic. |
| 3-amino-2-butanol | Lactic. |
| 1-amino-2-methyl-2-propanol | Butyric. |
| 3-amino-2-pentanol | Isobutyric. |
| 2-amino-1-pentanol | Valeric. |
| 2-amino-3-pentanol | Oxalic. |
| 1-amino-2-methyl-2-butanol | Glutaric. |
| 3-amino-2-methyl-2-butanol | Maleic. |
| 2-amino-2-ethyl-1,3-propanediol | Fumaric. |
| 2-amino-3-hexanol | Tartaric. |
| 2-amino-2-methyl-3-hexanol | Adipic. |
| 3-amino-2-methyl-4-heptanol | Cyclohexylacetic. |
| 2-amino-2-propyl-1,3-propanediol | Cyclohexylcarboxylic |
| 3-amino-4-heptanol | Benzoic. |
| 2-amino-2-isopropyl-1,3-propanediol | Phenylacetic. |
| 3-amino-3-methyl-4-heptanol | Phenylbutyric. |
| 3-amino-3-methyl-2-pentanol | |
| 5-amino-4-octanol | |

It will be apparent that my invention provides a simple, one-step process for the preparation of useful materials. The starting materials are relatively cheap and are readily prepared from cheap raw materials. The process permits the direct conversion of N-(2-hydroxyalkyl) amides into 2-mercapto thiazolines without it being necessary to isolate and purify any intermediate compound.

I claim:

1. The process of preparing a 2-mercapto thiazoline which comprises heating an N-(2-hydroxyalkyl) amide of a carboxylic acid and carbon disulfide at temperatures above 50° C. in the presence of at least one member of the group consisting of water and caustic alkali, employing at least 2 moles of carbon disulfide for each mole of the 2-mercapto thiazoline to be produced.

2. The process of preparing a 2-mercapto thiazoline which comprises heating one mole of an N-(2-hydroxyalkyl) amide of a carboxylic acid with about 2 to about 3 moles of carbon disulfide in a closed vessel under superatmospheric pressures at temperatures of from about 90° C. to about 200° C. in the presence of at least one mole of a member of the group consisting of water and caustic alkali.

3. The process of preparing a 2-mercapto thiazoline which comprises heating one mole of an N-(2-hydroxyalkyl) amide of an unsubstituted monocarboxylic aliphatic acid with about 2 to about 3 moles of carbon disulfide in a closed vessel under superatmospheric pressures at temperatures of from about 90° C. to about 200° C. in the presence of at least one mole of a member of the group consisting of water and caustic alkali.

4. The process of preparing a 2-mercapto thiazoline which comprises heating one mole of an N-(2-hydroxyalkyl) amide of an unsubstituted monocarboxylic acid with about 2 to about 3 moles of carbon disulfide in a closed vessel under superatmospheric pressures at temperatures of from about 90° C. to about 200° C. in the presence of water containing at least one mole of a member of the group consisting of caustic alkali and alkali metal formate.

5. The process of preparing a 2-mercapto thiazoline which comprises heating one mole of an N-(2-hydroxyethyl) amide of a carboxylic acid with about 2 to about 3 moles of carbon disulfide in a closed vessel under superatmospheric pressures at temperatures of from about 90° C. to about 200° C. in the presence of at least one mole of a member of the group consisting of water and caustic alkali.

6. The process of preparing a 2-mercapto thiazoline which comprises heating one mole of an N-(2-hydroxyethyl) amide of an unsubstituted monocarboxylic acid with about 2 to about 3 moles of carbon disulfide in a closed vessel under superatmospheric pressures at temperatures of from about 90° C. to about 200° C. in the presence of at least one mole of water.

7. The process of preparing a 2-mercapto thiazoline which comprises heating one mole of an N-(2-hydroxyethyl) amide of an unsubstituted monocarboxylic acid with about 2 to about 3 moles of carbon disulfide in a closed vessel under superatmospheric pressures at temperatures of from about 90° C. to about 200° C. in the presence of at least one mole of an aqueous solution of caustic alkali.

8. The process of preparing a 2-mercapto thiazoline which comprises heating one mole of an N-(2-hydroxyethyl) amide of an unsubstituted monocarboxylic aliphatic acid with about 2 to about 3 moles of carbon disulfide in a closed vessel under superatmospheric pressures at temperatures of from about 90° C. to about 200° C. in the presence of water containing at least one mole of a member of the group consisting of caustic alkali and alkali metal formate.

9. The process of preparing 2-mercapto thiazoline which comprises heating one mole of N-(2-hydroxyethyl) formamide with about 2 to about 3 moles of carbon disulfide in a closed vessel under superatmospheric pressures at temperatures of from about 90° C. to about 130° C. in the presence of at least one mole of a member of the group consisting of water and caustic alkali.

10. The process of preparing 2-mercapto thiazoline which comprises heating one mole of N-(2-hydroxyethyl) formamide with about 2 to about 3 moles of carbon disulfide in a closed vessel under superatmospheric pressures at temperatures of from about 90° C. to about 130° C. in the presence of at least one mole of water.

11. The process of preparing 2-mercapto thiazoline which comprises heating one mole of N-(2-hydroxyethyl) formamide with about 2 to about 3 moles of carbon disulfide in a closed vessel under superatmospheric pressures at temperatures of from about 90° C. to about 130° C. in the presence of water containing at least one mole of a member of the group consisting of caustic alkali and alkali metal formate.

12. The process of preparing 2-mercapto thiazoline which comprises heating one mole of N-(2-hydroxyethyl) formamide with about 2 to about 3 moles of carbon disulfide in a closed vessel under superatmospheric pressures at temperatures of from about 90° C. to about 130° C. in the presence of at least one mole of an aqueous solution of caustic alkali.

PAUL SWITHIN PINKNEY.